United States Patent
Watanabe et al.

(10) Patent No.: US 6,381,522 B1
(45) Date of Patent: Apr. 30, 2002

(54) METHOD FOR CONTROLLING A HYBRID VEHICLE

(75) Inventors: Tohru Watanabe; Shinsuke Takahashi, both of Yokohama; Teruji Sekozawa, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/501,057

(22) Filed: Feb. 9, 2000

(30) Foreign Application Priority Data

Feb. 9, 1999 (JP) .......................................... 11-030973

(51) Int. Cl.[7] .............................. H02J 7/00; B60K 6/04; G01C 21/00
(52) U.S. Cl. ..................... 701/22; 701/213; 180/65.2; 318/139
(58) Field of Search ............................. 701/22, 213, 1, 701/123, 99, 209; 180/65.4, 65.1, 65.3, 65.2, 65.8, 243; 318/587, 139; 702/63

(56) References Cited

U.S. PATENT DOCUMENTS

| | | | |
|---|---|---|---|
| 4,361,202 A | * 11/1982 | Minovitch | 180/168 |
| 5,359,308 A | * 10/1994 | Sun et al. | 335/216 |
| 5,426,589 A | * 6/1995 | Kitagawa et al. | 364/480 |
| 5,539,399 A | * 7/1996 | Takahira et al. | 340/995 |
| 5,627,752 A | * 5/1997 | Buck et al. | 364/424.04 |
| 5,778,326 A | * 7/1998 | Moroto et al. | 701/22 |
| 5,815,824 A | * 9/1998 | Saga et al. | 701/22 |
| 5,823,280 A | * 10/1998 | Lateur et al. | 180/65.2 |
| 5,832,396 A | * 11/1998 | Moroto et al. | 701/22 |
| 5,892,346 A | * 4/1999 | Moroto et al. | 318/587 |
| 5,929,595 A | * 7/1999 | Lyons et al. | 320/104 |
| 5,941,328 A | * 8/1999 | Lyons et al. | 180/65.1 |
| 6,034,492 A | * 3/2000 | Saito et al. | 318/141 |
| 6,059,064 A | * 5/2000 | Nagano et al. | 180/243 |

FOREIGN PATENT DOCUMENTS

| | | |
|---|---|---|
| JP | 08126116 | 5/1996 |
| JP | 10098805 | 4/1998 |

OTHER PUBLICATIONS

Kohji Tanaka, "4.5.5 Brake Energy Regeneration," *Basics and Theory, Automotive Technology Handbook* (vol. 1), Automotive Technology Society (of Japan) Dec. 1, 1990, pp. 137–140 (not translated).

* cited by examiner

*Primary Examiner*—Tan Nguyen
*Assistant Examiner*—Dalena Tran
(74) *Attorney, Agent, or Firm*—Townsend and Townsend and Crew LLP

(57) ABSTRACT

In a vehicle equipped with an engine and a regenerative system, the quantity of energy storage by the regenerative system is scheduled, and fuel efficiency and driving ease are controlled. If the destination of a vehicle and a route to reach it are not indicated, automatic scheduling is performed. Vehicle scheduling is performed by predicting the distribution of height positions the vehicle is predicted to reach at future points of time and using the representative value of the height at each point of time.

23 Claims, 8 Drawing Sheets height interval H H arrival possible range at t=n sample of charge controlling without prediction optimization of charge amount reflecting upon height distribution at future time

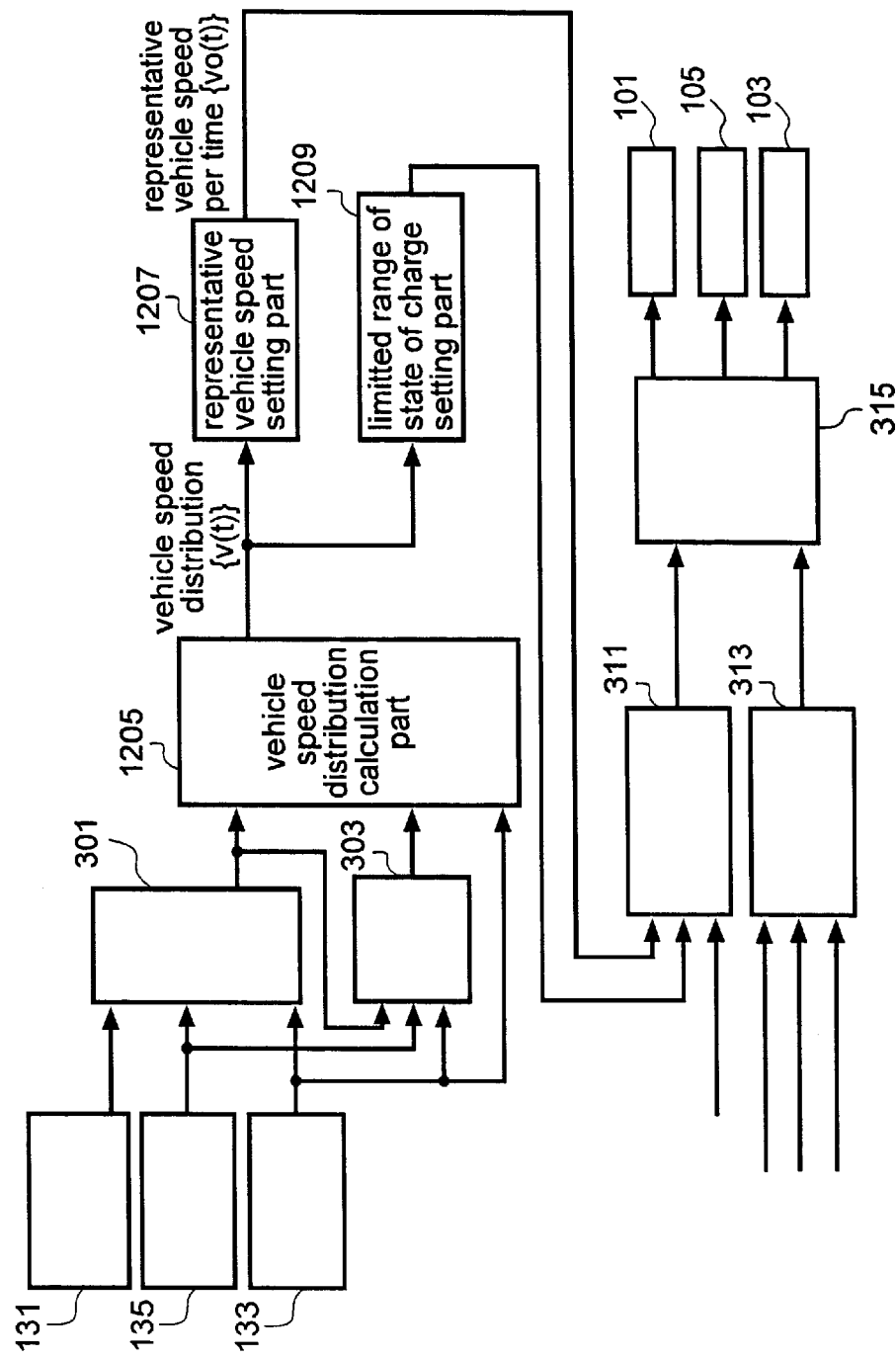

METHOD FOR CONTROLLING A HYBRID VEHICLE

BACKGROUND OF THE INVENTION

The present invention relates to a method for controlling a hybrid vehicle, and more particularly to a method for optimally controlling a hybrid vehicle having an engine and a regenerative system which converts, stores and discharges the kinetic energy of the vehicle.

In braking with a drum brake or a disk brake, the kinetic energy of the vehicle is discarded as heat. On the other hand, there are some vehicles which improve fuel efficiency with a regenerative system for making use of their kinetic energy when storing. For instance, a vehicle disclosed in the Japanese Published Unexamined Patent Application No. Hei 10-98805 is equipped with a system which converts kinetic energy into electric energy with a rotary machine and stores the converted energy in its battery. Other known examples include a regenerative system using elastic elements, compressed air, a flywheel, a hydraulic pump and so forth, described in the Basics and Theory, Automotive Technology Handbook, Vol. 1, issued by the Automotive Technology-Society (of Japan), Dec. 1, 1990, pp. 137–140.

A hybrid vehicle equipped with one or another of these regenerative systems can enhance fuel efficiency and driving ease by controlling the output ratio between a primary power source, such as an engine, and a secondary power source consisting of a regenerative system. For instance, a method by which the destination is entered to determine the traveling route and a schedule for the state of charge of the battery on the route, as disclosed in the Japanese Published Patent Application No. Hei 8-126116, can be applied to a vehicle provided with a rotary machine (motor) and a storage battery. According to this method, the state of charge of the battery is increased before an upward slope to help prevent deterioration of the driving conditions due to a power shortage on the climb. Further, by reducing the state of charge of the battery and increasing the quantity of energy regenerated by a regenerative brake, improve fuel efficiency and enhanced driving ease are provided, while ensuring a sufficient level of braking force.

There is a problem in that no long term scheduling can be done unless the destination and the route thereto are indicated. Furthermore, even though the destination and the route thereto are specified and the driving plan is made, if the vehicle deviates from the planned route as a result of an error in driving or a change in the driver's plans, both fuel efficiency and driving ease will deteriorate.

SUMMARY OF THE INVENTION

According to the present invention, a hybrid vehicle is controlled by calculating the distribution of heights the vehicle is predicted to reach for each point of time; calculating the representative value of height at each point of time from this distribution of heights for each point of time; and, it being assumed that the vehicle will pass the point of representative height of that representative value, scheduling the energy recovery and discharge quantities of the regenerative system and the engine output. The method according to the invention makes it possible to make a medium to long range driving plan even where the destination and the route thereto are not specified, and thereby to improve fuel efficiency.

According to the invention, a hybrid vehicle is controlled by calculating the distribution of probabilities pertaining to the energy state of a vehicle at each point of time from the current moment onward, determining the setting range of target energy storage quantity at each point of time according to the dispersion of the distribution of the energy state, and scheduling the energy regeneration and discharge quantities of the regenerative system and the engine output so as to be consistent with the limit range. As a result, when a driving plan is made according to the scheduling method described above, the driving conditions can be enhanced by providing an excess or a shortage of regenerative system energy.

In the method of above, preferably either the distribution of heights or a distribution pertaining to the vehicle speed or both are used as the distribution(s) of probabilities pertaining to the vehicle energy state to control the hybrid vehicle. As a result, a driving plan can be made on the basis of determinants of the state of energy to achieve satisfactory control.

In the method above, a hybrid vehicle is controlled by calculating the reachable point at each point of time and the probability of arriving there from the ratio of branching into different routes at each junction ahead of the vehicle and the predicted time to cover a given section, determining the height of the point to be reached, calculating the distribution of the probabilities of the vehicle's arrival at a given height at that point of time, and calculating the distribution of probabilities pertaining to the energy state of the vehicle at each point of time on the basis of the distribution of height probabilities so calculated.

A hybrid vehicle is controlled by calculating the distribution of heights of points contained in a set consisting of at least either the points within a prescribed spatial range from the current position of the vehicle or the points reachable within a prescribed length of time, and setting the target quantity of energy storage of the regenerative system so that it become closer to the center of the proper range as the dispersion of the height distribution increases. As a result, the vehicle can be controlled in a relatively small number of procedural steps though inferior in accuracy.

BRIEF DESCRIPTION OF THE DRAWINGS

FIG. 11 is a block diagram block diagram for processing in another embodiment of the invention.

DESCRIPTION OF THE SPECIFIC EMBODIMENTS

Figure 1:
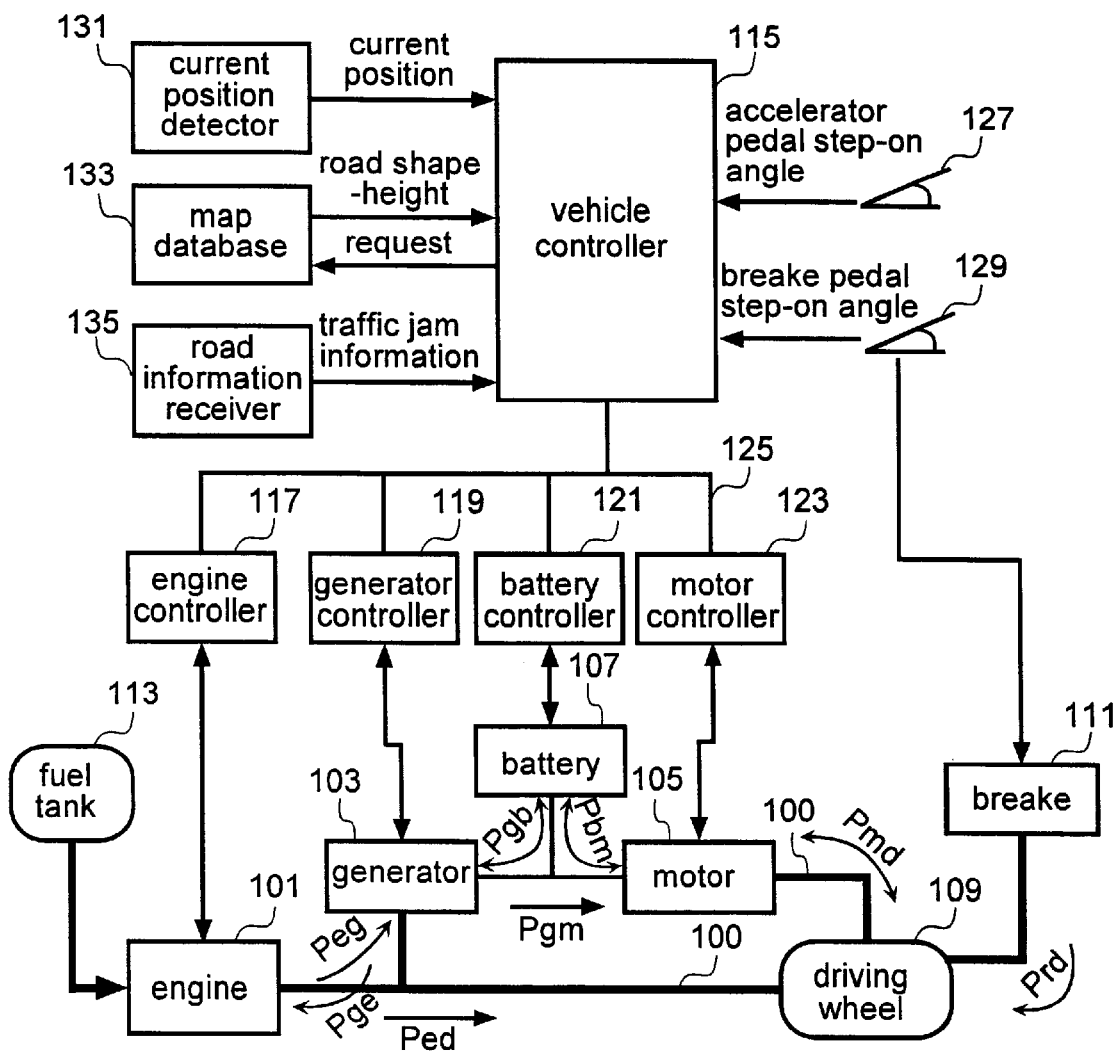
FIG. 1 is a block diagram of the configuration of a vehicle.

A vehicle control method according to one embodiment of the present invention is described below with reference to accompanying drawings. With reference to FIG. 1, the configuration of a vehicle control system is depicted for a vehicle control method according to this embodiment.

The vehicle system according to a first embodiment is equipped with, as its power sources, an engine 101 which is an internal combustion engine, as well as a rotary machine system consisting of a generator 103 and a motor 105. These items are connected to power transmission shafting 100 consisting of gears and a clutch, and together drive wheels 109, either directly or indirectly. The surplus of electric power generated by the generator 103 which is not consumed by the motor 105 is stored in battery 107, and discharged as the power supply is required. A system which converts, stores and supplies the kinetic energy or the engine output of a vehicle is called a regenerative system. In this embodiment, the generator 103, the motor 105 and the battery 107 constitute a regenerative system.

Engine 101 is controlled and monitored by an engine controller 117. The generator 103 is controlled and monitored by a generator controller 119. Motor 105 is controlled and monitored by a motor controller 123. The battery 107 is controlled and monitored by a battery controller 121. These controllers in turn, are controlled by a vehicle controller 115. An internal network 125 connects the controllers to one another.

The vehicle system, fitted with a current position detector 131 consisting of a GPS (global positioning system) antenna and other items, supplies information on the vehicle's current position to the vehicle controller 115. A map database 133, at the request of the vehicle controller 115, supplies the vehicle controller 115 with data on the current position of the vehicle and the widths, intersections and heights of nearby and other local roads. A road information receiver 135, comprising a road beacon receiver, a radio antenna and the like, receives publicly available information on road traffic, and supplies it to the vehicle controller 115.

An accelerator pedal 127 is fitted with a position meter (not shown), which supplies information on the accelerator pedal treading angle to the vehicle controller. A brake pedal 129 is fitted with a position meter (not shown), which supplies information on the brake pedal treading angle to the vehicle controller. A brake 111, connected to the brake pedal 129 either mechanically or electrically, applies braking power to the driving wheels according to the treading angle of the brake pedal. This brake converts the kinetic energy of the driving wheels with either brake pads or brake drums into heat, which is discarded into the atmosphere.

Figure 2:
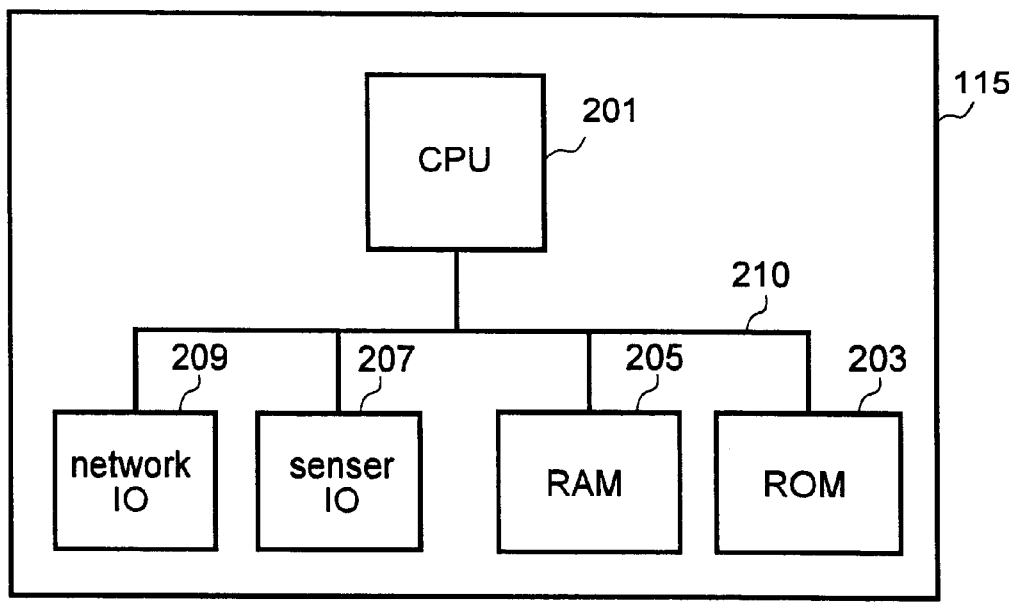
FIG. 2 is a configuration of a vehicle controller for a vehicle.

Details of the vehicle controller 115 are described with reference to FIG. 2. The vehicle controller consists of a CPU 201, a ROM 203, a RAM 205, a sensor 10, and a network IO connected to one another by a bus 210. The CPU 201 controls the vehicle in accordance with a control program stored in the ROM 203. Necessary variables for computation by the CPU 201 are stored into the RAM 205 as data. Data transmission and reception to and from the current position detector 131, map database 133, and road information receiver 135 and reception of signals on the accelerator pedal treading angle and brake pedal treading angle are accomplished via a sensor IO 207, and the results are stored in the CPU 201 or the RAM 205. Data transmission and reception to and from the internal network 125 are accomplished via the network 10 209, and the results are stored in the CPU 201 or the RAM 205. The engine controller 117, generator controller 119, battery controller 121, and motor controller 123 have similar configurations to that of the vehicle controller 115 shown in FIG. 2.

Figure 3:
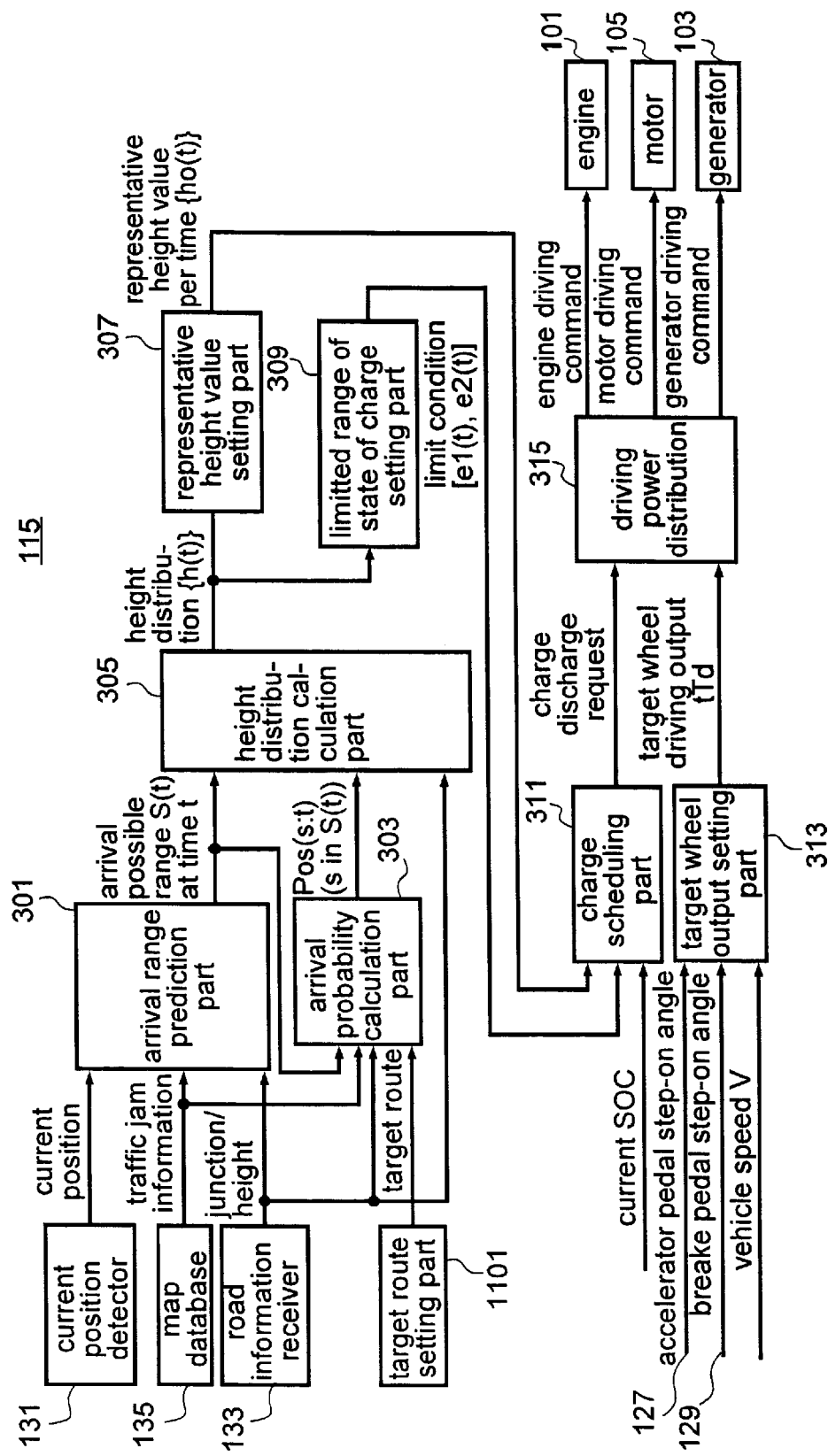
FIG. 3 is a block diagram of a processing system of a preferred embodiment of the invention.

FIG. 3 is a block diagram of the vehicle control method according to this embodiment. The process shown in this block diagram is executed by the vehicle controller 115. This embodiment does not use a target route setting operation 1101.

An arrival range prediction block 301, on the basis of the current position detected by the current position detector 131, geographical data from the map database 133 and traffic jam information from the road information receiver 135, calculates a reachable range S(t) from the current position. This calculation is performed for each point of time t from the current time until a prescribed point of time, for instance at five-minute intervals until 30 minutes later. Calculation of S(t) is accomplished by determining the required length of time to cover the distance between adjacent ones of link points stored in the map database. It is assumed that the distance between each pair of adjacent link points is traveled at the maximum speed the level of road congestion allows. The system identifies a reachable link point by comprehensively searching all road connections between each pair of adjacent link points. The link points are all the junctions, branching points and points positioned at prescribed intervals on roads between junctions.

An arrival probability calculation part 303 calculates the probability of the arrival of the vehicle at a point of time t at each link point included in S(t). In the probability calculation, the probability of route choice is set for each branching point in the following manner. Probabilities are so set that the greater the width of a given road in the map database 133, the more likely the road is chosen, while the more intense its congestion according to the road information receiver 135, the less likely the road is chosen. It is supposed that the greater the road width, the faster the vehicle will travel that the more intense the traffic jam, the slower the vehicle will travel. The distribution of time periods taken to cover the distance between each pair of adjacent link points is calculated on that basis. The probability Pos(s;t) of the vehicle's presence at each link point s included in S(t) after a point of time t is calculated from the probability of route choice at each branching point and the distribution of traveling time lengths between link points. If the vehicle is not right on any given link point, it is assumed to be on the nearest link point.

An elevation or height distribution calculation block 305 calculates the distribution of heights where the vehicle will be positioned from the reachable range S(t) and the arrival probability Pos(s;t) at each point of time t and height data from the map database. Thus the following distribution is calculated. The height of a link point read from the map database being represented by H(s), the relative height from the lowest level of the road (e.g. −200 m) from its highest level (e.g. 4000 m) is divided into sections HH(i) of a prescribed length (e.g. 1 m). For each s included in S(t), HH(t;i) determined by the following equation is calculated out for each section HH(i), S(t;i) representing all whose H(s) belongs to the section HH(i).

$$hh(t; i) = \sum_{s \in S(t;i)} Pos(s; t) \quad (1)$$

In this way, the probability of the presence of the vehicle at a point of time t in each height-based section is calculated.

Figure 5:
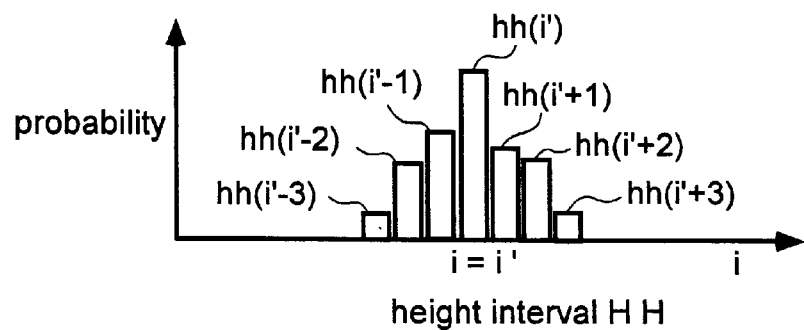
FIG. 5 is a diagram illustrating a height distribution for an embodiment of the invention.

FIG. 5 is a graph in which the height-based section is plotted on the horizontal axis, and the probability of presence, on the vertical axis. The relationship shown in this graph is the distribution of probabilities of heights at which the vehicle is present at a point of time t. While a finite number of link points is used here, the distribution of heights in a continuous sequence may as well be calculated by assuming S(t) to be a continuum and the length of the height-based section is shifted to an infinitesimal.

A representative height value setting part 307 calculates the representative value ho(t) of height at each point of time from the probability of height h(t) at each point of time t. The average height given by the following equation is used as the representative value:

$$ho(t) = E(h(i; t)) = \sum_i H'(i) \times hh(t; i) \quad (2)$$

where H'(i) is the average height in the section HH(i).

An alternative way to calculate the average is to calculate the representative value at a point of time t with the unevenness of the shape of the probability distribution h(t) taken in account. For instance, where h(t) expands in the increasing direction of t, satisfactory control can be achieved in a specific road situation, such as on a mountain road, by using a representative value greater than the average according to the degree of expansion.

Figure 6:
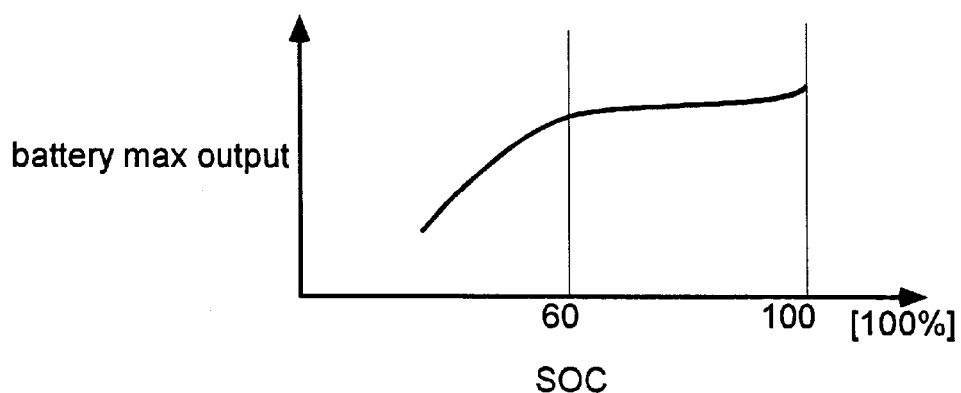
FIG. 6 is a diagram illustrating the output characteristics of a battery in an embodiment of the invention.

A state of charge limit range setting block 309 sets the limiting conditions regarding the state of charge for charge scheduling at the following charge scheduling block 311. For the description of processing by this block 309, the characteristics of the battery 107 of the vehicle used in this embodiment will be described. FIG. 6 is a diagram illustrating the output characteristics of the battery in this embodiment relative to the state of charge (hereinafter SOC). When the SOC is 100%, the maximum output is attained. When the SOC falls below 60%, the output drops rapidly. As a result, the driving power of the motor weakens, and the driving capability deteriorates.

Figure 7:
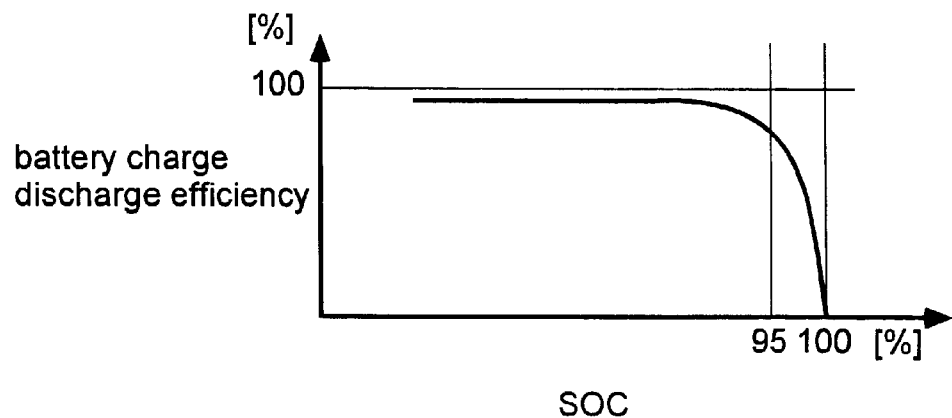
FIG. 7 is a diagram illustrating the charge/discharge efficiency characteristics of the battery in an embodiment of the invention.

FIG. 7 illustrates the charge/discharge efficiency characteristics of the battery. The charge/discharge efficiency means the ratio of the level of discharge obtained to a given level of charge. Whereas a nearly 100% charge/discharge efficiency is achieved in an SOC region of 95% or below, the efficiency drops beyond an SOC of 95%. At an SOC of 100%, any further charge would be an overcharge, and charging is virtually impossible, making the regenerative brake inoperable. Processing by this block 309 sets the limits of the target range of the SOC on the basis of the height distribution h(t) so as to prevent the driving ease from deteriorating at a prescribed significant level a at a point of time t.

First the lower limit to the target SOC is calculated. The height gives the vehicle the electrical potential energy Eh(h) [J (joule)] represented by the following equation:

$$Eh(h) = Mgh \quad (3)$$

$$Pr(60 \leq soc(t) + K\Delta h \leq 100) > a \quad (4)$$

where M is the weight of the vehicle, and g the gravitational acceleration. The electrical potential energy is recovered by the regenerative system as electrical energy when the height position has changes. The variation in range of the SOC per meter of height difference then is a fixed value k [%/m], assuming the motor efficiency is fixed. Therefore, the representative value of height ho(t) at a predicted point of time and the realized value hr(t) of height at a real point of time t being represented by $\Delta h(t)$, the SOC will decrease or increase by $x\Delta h$. The value of $\Delta h(t)$ at a future point of time t is a matter of probability at the current time, and the distribution of $\Delta h(t)$ values is determined uniquely by h(t). Therefore, by solving Equation (4) by using h(t), the range [e1(t), e2(t)] of the SOC(t) in which the SOC is kept between 65% and 100% can be calculated even if there is a probability for $k \times \Delta h$ to vary relative to a prescribed significant level a (e.g. 0.99). This limit range [e1(t). e2(t)] regarding the setting of the SOC target at this point of time t is the output of the block 309.

The greater the dispersion of $\Delta h$, i.e. the greater the dispersion of h(t), the narrower the range of [e1(t), e2(t)]. This allows setting a narrower SOC limit range in the charging schedule according to the dispersion of h(t). In this way, processing requires a fewer steps, although accuracy is decreased.

Next, the charge scheduling block 311 performs charge scheduling on the basis of the representative value of height ho (t) at each point of time t calculated by the block 307 and the representative value of height ho(t) and the SOC limit, range [e1(t), e2(t)], and supplies a charge/discharge request to a driving power distribution unit 315 giving priority to either power generation or driving (discharge) according to the result of charge scheduling and the current SOC value. In the charge scheduling by this embodiment, the height position ho(t) of the vehicle at each point of time t (at five minutes' intervals from the current time until 30 minutes later) is assumed, and the target for the battery SOC to minimize the fuel consumption under this condition is calculated for each point of time. However, the target at each point of time should be satisfy the condition of the limit range [e1(t), e2(t)]. If the actual SOC is greater than the SOC thereby calculated, the priority of the charge/discharge request is given to driving (discharge). If the actual SOC is smaller, the priority is given to generation.

Figure 8:
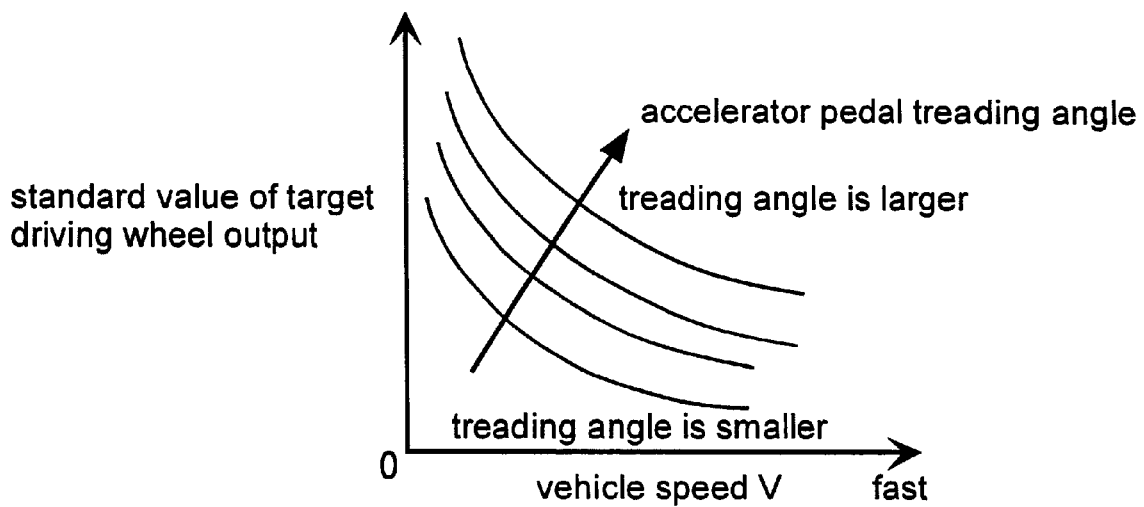
FIG. 8 is a diagram for determination of the driving output for a target axle in an embodiment of the invention.
Figure 9:
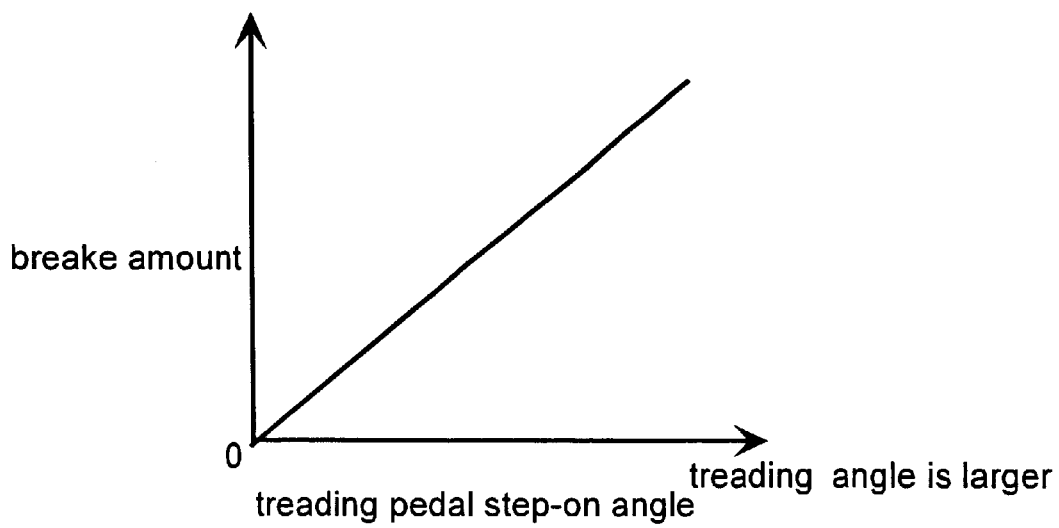
FIG. 9 is another diagram pertaining to the determination of the driving output for the target axle.

A target axle output setting part 313 determines the target of driving power to be supplied to the driving axle on the basis of the accelerator pedal treading angle APS, the brake pedal treading angle BRS and the vehicle speed V. First, according to the map shown in FIG. 8, the standard value of the target axle output is determined from APS and the vehicle speed V. Further, the balance of the subtraction of the brake amount according to the brake pedal treading angle at the ratio shown in FIG. 9 from this standard value is supplied as the target axle driving output tTd.

The driving power distribution unit 315 calculates the engine output, motor output and generator output on the basis of a charge/discharge request from the block 311 and a target axle driving output from the block 313, and supplies the respective target values to the engine, motor and generator. Here, the sum of the balance of the subtraction of the output required for power generation from the engine output and the motor output is the axle output. This axle output is caused to be identical with tTd figured out by the block 313. The individual driving ratio of the engine, motor and generator are determined with reference to tables prepared in advance. Two kinds of such tables are prepared, one giving priority to power generation by increasing the ratio of the generated power and the other giving priority to driving by increasing the ratio of the motor driving power. Either is selectively read in accordance with a charge/discharge request from the block 311.

Figure 4:
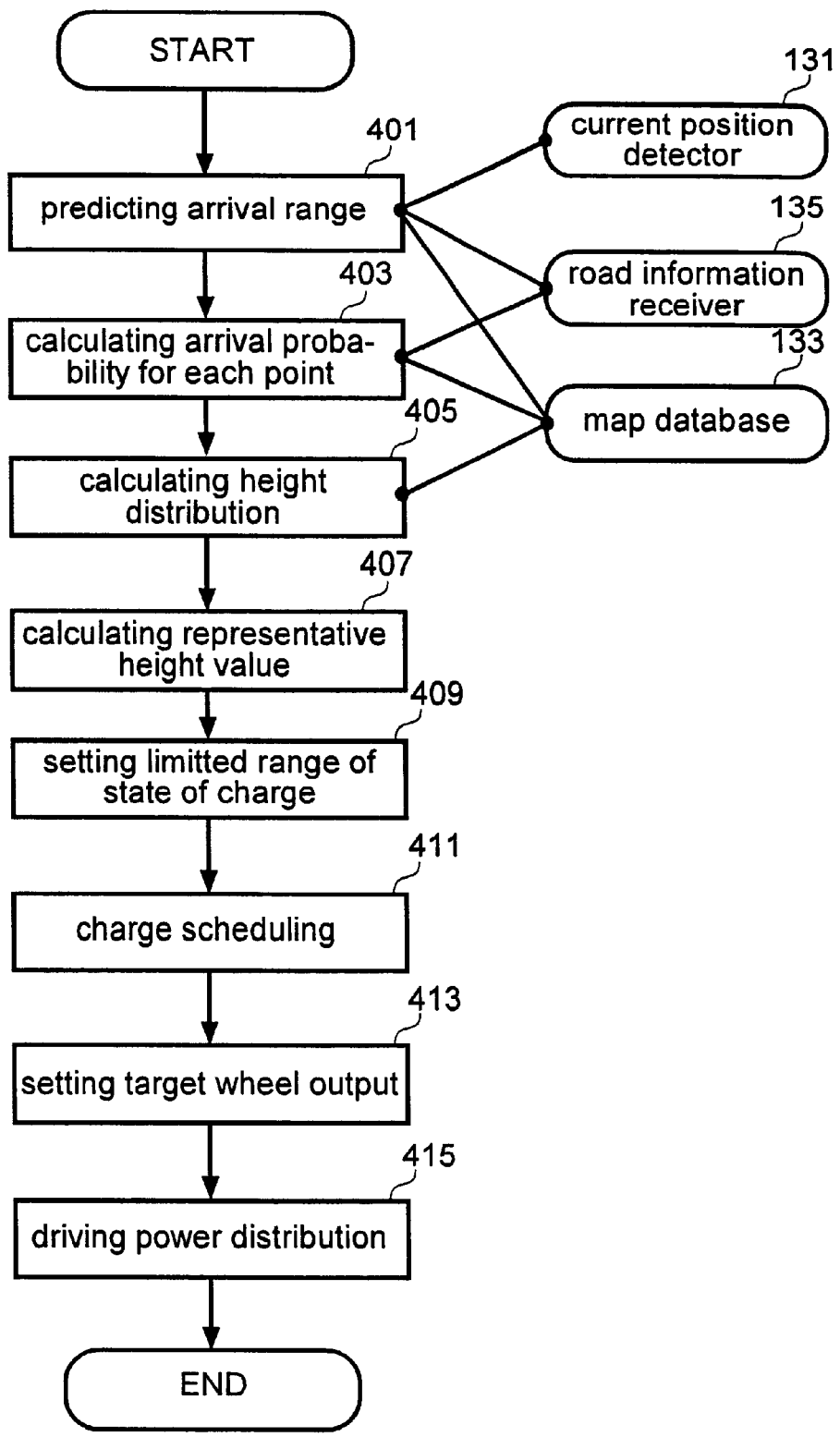
FIG. 4 is a flowchart of the processing steps in a preferred embodiment of the invention.

FIG. 4 shows the flow of the processing by the vehicle control method according to the embodiment of the invention shown in FIG. 3. At step 401, the arrival range prediction part 301 predicts the arrival range S(t) of the vehicle. At step 403, the arrival probability calculation part 303 calculates the arrival probability at each point included in the vehicle's arrival probability range S(t).

At step 405, the height distribution calculation part 305 calculates the height distribution h(t). At step 407, the representative height value setting part 307 calculates the representative height value ho(t) at each point of time. At step 411, the charge scheduling part 311 schedules the SOC.

At step 413, the target axle output setting part 313 sets the target axle output. At step 415, the driving power distribution unit 315 sets and supplies the driving target values of the engine, motor and generator.

Although the foregoing embodiment is a vehicle equipped with a regenerative system consisting of a battery and a motor, the present invention is not confined to this embodiment. A vehicle equipped with a regenerative system using elastic elements, compressed air, a flywheel, a hydraulic pump or the like also has its own output characteristics and efficiency characteristics like the output characteristics and efficiency characteristics of the battery illustrated in FIGS. 6 and 7. In a regenerative system using a flywheel, for instance, the kinetic energy of the vehicle is converted into the rotational energy of the flywheel and accumulated. Then, if the number of revolutions falls below a certain level, it will become difficult to discharge energy. Or, if the number of revolutions rises beyond a certain upper limit, frictional loss will become too great to allow the energy to be stored. According to the characteristics of each regenerative system, the limit range of regenerated energy accumulation is set like the limit range set by the block 309 shown in FIG. 3.

The advantages of the invention manifested by this embodiments will now be described with reference to FIGS. 10A, 10B and 10C.

Figure 10A:
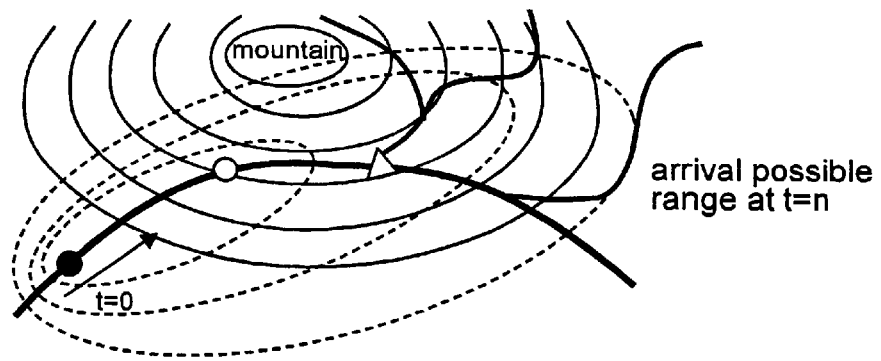
FIG. 10A illustrates a sample road environment.
Figure 10B:
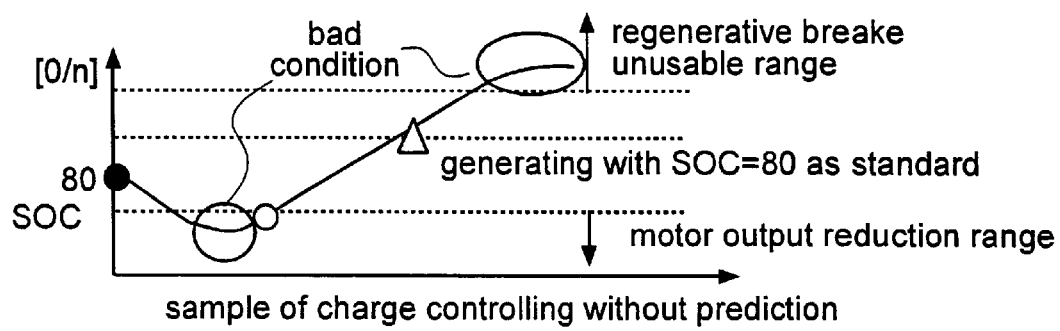
FIG. 10B illustrates variations in the state of charge of the vehicle's battery under control without prediction.
Figure 10C:
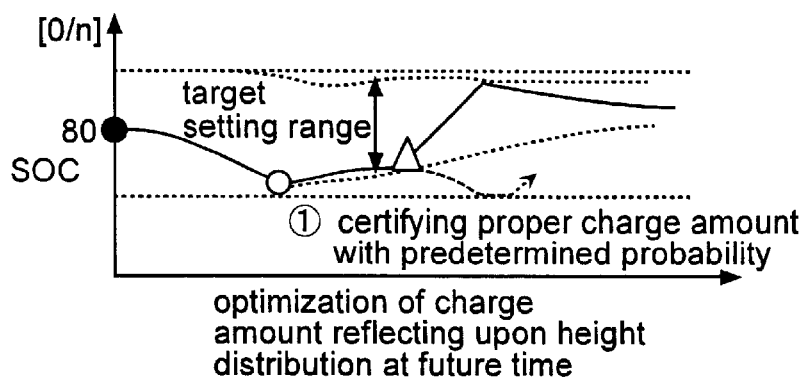
FIG. 10C illustrates variations in the state of charge of the vehicle's battery where the vehicle is controlled according to the invention.

FIG. 10A illustrates a road environment in which a vehicle is about to travel. It is supposed that there is no particular traffic jam, and that at a point of time 0 the vehicle is in a position marked with ● and will travel on the bold line in the direction of ○ and △. FIG. 10B shows variations in the SOC of the vehicle's battery where control is performed without prediction of the future environment. As the vehicle travels uphill from the position of ● to that of ○ and thereby consumes electric power, the SOC falls, and the motor output drops. Further during the downhill run beyond the position marked with △, power generation by the regenerative brake raises the SOC beyond 100%, and the regenerative brake will no longer work. As opposed to this, variations in the SOC of the battery under vehicle control according to the invention are shown in FIG. 10C. Since the representative height value of the mountain road from ● to ○ is known, the necessary SOC for climbing is attained at the ● point. Therefore, no drop in motor output occurs before the vehicle reaches the position marked with ○. Further, during the trip from ○ to △, charge scheduling is accomplished on the basis of the representative value of height after further prescribing a limit to of the target SOC on the basis of a height distribution including both an uphill route and a downhill route at the position marked with △. As a result, satisfactory driving is ensured both when the vehicle travels downhill by the route marked with the bold line (variations in the SOC represented by the solid line in FIG. 10), the probability of whose choice is high, and when an uphill route is chosen (variations in the SOC represented by the broken line in FIG. 10C).

A second preferred embodiment of the present invention will now be described. FIG. 3 is a block diagram of processing by this embodiment, which differs from the first embodiment in that is provided with a target route setting part 1101. The block 1101 calculates the optimal route to the destination entered by the driver. The arrival probability calculation part 303 in this embodiment, unlike its counterpart in the first embodiment, calculates the probability of reaching each link point by using target route information entered from the block 1101. Thus, it assigns the highest probability (e.g. 90% or more) for the choice of a route along the target route in the event the road branches, and increases the probability for the choice of another route depending on the road shape and the degree of congestion. (For instance, if the target route and another route are equal in width, the probability of deviation from the target route is 1%, and the probability increases to a maximum of 10% with an expansion in road width.) This method makes possible more efficient charge scheduling when a target route is given. Moreover, even if any deviation from the target route arises, there is no fear of the driving ease deteriorating substantially because the target SOC is limited to a certain level by the block 309.

A third preferred embodiment of the present invention will now be described. FIG. 11 is a block diagram illustrating this embodiment. Blocks shown here bearing the same reference numerals as in FIG. 3 function in respectively the same ways as their counterparts there. In the block diagram of FIG. 11, blocks 1205, 1207 and 1209 are provided respectively in place of the blocks 305, 307 and 309 shown in FIG. 3. A vehicle speed distribution calculation part 1205 calculates the variable range of the vehicle speed on the basis of traffic jam information at each point of the reachable range, and calculates the distribution of vehicle speed variable range at each point of time t, instead of the height distribution, by synthesizing the speed variable range with the probability of arrival. A representative vehicle speed setting part 1207 calculates the representative value of the vehicle speed variable range at each point of time t. Then, a state of charge limit range setting part 1209 sets the SOC limit range in charge scheduling by the following block 311 on the basis of the distribution of the vehicle speed variable ranges. Here, the vehicle has, at a speed v, kinetic energy Ev(h) [J (joule)] represented by the following equation.

$$Ev(v) = \tfrac{1}{2}Mv^2 \quad (5)$$

Then, the variable range Δv of v becomes the varying factor of regenerative energy in place of the height variable range Δh. In the same way as Equation (4) was solved for the first embodiment, even where the vehicle speed varies by Δv, the target value range [e1(t), e2(t)] for keeping the SOC within a proper range at a significant level can be calculated. This is the output of the block 1209.

This embodiment is particularly effective where the vehicle is traveling at high speed on a road with no significant height differences. In such a case, the determinant of regenerative energy is a variation in kinetic energy. On the basis of the distribution of this kinetic energy, charge scheduling is performed, and satisfactory driving ease can be thereby secured.

A fourth preferred embodiment of the present invention will now be described. The block diagram of processing by this embodiment is similar to the block diagram shown in FIG. 3 except that blocks 303 and 1101 are dispensed with, and that the lock 305 calculates the height distribution on the basis of the assumption that the probability of arriving at any point within the reachable range is equal. This embodiment, though inferior in the accuracy of height distribution, has the advantage of permitting processing in a smaller number of steps. For this embodiment, the processing by the block 303 in the first, second and third embodiments can be replaced by processing to regard distances determined by the average vehicle speed and the elapsed time from the current geographical point or points at a prescribed distance as the reachable range. Though inferior in accuracy, processing is simpler.

A program for executing the hybrid vehicle control method according to the invention can also be stored into a computer-readable recording medium and, when it is to be executed, loaded onto a memory for execution.

According to the present invention, even where the destination of a vehicle and a route to reach there are not indicated, driving of the vehicle can be scheduled on a long term basis by probability-based prediction and fuel efficiency can be thereby enhanced. Furthermore, where a driving plan is made by specifying the route, even if deviations from the planned route occur in actual driving, fuel efficiency and driving conditions are controlled.

The preceding has been a description of the preferred embodiment of the invention. It will be appreciated that deviations and modifications can be made without departing from the scope of the invention, which is defined by the appended claims.

What is claimed is:

1. A method for controlling a hybrid vehicle which includes a regenerative system for converting kinetic energy and an engine, comprising the steps of:
   predicting a plurality of points that the hybrid vehicle can reach at a predetermined time, using stored map information;
   calculating a probability that the hybrid vehicle reach each one of the points;
   calculating a distribution of elevations that the hybrid vehicle can reach at the predetermined time; and
   controlling the regenerative system and the engine based on the distribution of elevations.

2. The method for controlling a hybrid vehicle according to claim 1 wherein said step of controlling calculates representative value of elevations using the distribution of elevations and controls the regenerative system and the engine using the representative value of elevations.

3. The method for controlling a hybrid vehicle according to claim 1 wherein said step of controlling calculates a distribution of energy states of the hybrid vehicle at the predetermined time using the distribution of elevations and controls the regenerative system and the engine using the distribution of energy states.

4. The method for controlling a hybrid vehicle according to claim 3 wherein said step of controlling determines a setting range of target energy storage quantity according to the distribution of energy state at the predetermined time and controls the regenerative system and the engine to satisfy the setting range.

5. The method for controlling a hybrid vehicle according to claim 1 wherein said step of calculating the probability calculates the probability by calculating a probability of route choice at a junction including the map information, and the probability of route choice uses the route chosen from routes connected to the junction.

6. The method for controlling a hybrid vehicle according to claim 5 wherein said step of calculating the probability changes the value of the probability of route choice according to width of the routes.

7. The method for controlling a hybrid vehicle according to claim 5, further comprising the step of receiving traffic congestion information that shows a degree of traffic congestion of the routes and the step of calculating the probability changes the value of the probability of route choice according to the traffic congestion information.

8. A controller of a hybrid vehicle for controlling a regenerative system for converting kinetic energy and an engine included in the hybrid vehicle comprising:
   means for predicting a plurality of points that the hybrid vehicle can reach at predetermined time, using stored map information;
   means for calculating a probability that the hybrid vehicle reaches each point of the points;
   means for calculating a distribution of elevations that the hybrid vehicle can reach at the predetermined time; and
   means for outputting a signal for controlling the regenerative system and the engine based on the distribution of elevations.

9. The controller of a hybrid vehicle according to claim 8 wherein said means for outputting calculates representative value of elevations using the distribution of elevations, and generates the signal for controlling the regenerative system and the engine using the representative values of elevations.

10. The controller of a hybrid vehicle according to claim 8 wherein said means for outputting calculates distribution of energy state of the hybrid vehicle at the predetermined time using the distribution of elevations, and generates the signal for controlling the regenerative system and the engine using the distribution of energy state.

11. The controller of a hybrid vehicle according to claim 10 wherein said means for outputting determines the setting range of target energy storage quantity according to the distribution of energy state at the predetermined time and controls the regenerative system and the engine satisfying the setting range.

12. The controller of a hybrid vehicle according to claim 8 wherein said means for calculating the probability calculates the probability by calculating probability of route choice at a junction using the map information, and the probability of route choice shows degree of which route chosen from routes connected to the junction.

13. The controller of a hybrid vehicle according to claim 12 wherein said means for calculating the probability changes a value of the probability of route choice according to width of the routes.

14. The controller of a hybrid vehicle according to claim 12, further comprising means for connecting a receiver within the hybrid vehicle to receive traffic congestion information that shows a degree of traffic congestion of the routes and wherein said means for calculating the probability changes the value of the probability of route choice according to the traffic congestion information.

15. A hybrid vehicle including a regenerative system for converting kinetic energy and an engine comprising a vehicle controller responsive to stored map information, and a processor for predicting a plurality of points that the hybrid vehicle can reach at a predetermined time, based on stored map information which calculates a probability that the hybrid vehicle reach designated locations, the processor calculating a distribution of elevations that the hybrid vehicle can reach at the predetermined time using the probability, and outputting a signal for controlling the regen erative system and the engine based on the distribution of elevations;

an engine controller connected to said vehicle controller and said engine, and controlling said engine based on the signal; and a regenerative system controller connected to said vehicle controller and said regenerative system, and controlling said regenerative system based on the signal.

16. The hybrid vehicle according to claim 15, further comprising a map database.

17. The hybrid vehicle according to claim 15 wherein said processor calculates representative values of elevations using the distribution of elevations, and generates the signal for controlling the regenerative system and the engine using the representative value of elevations.

18. The hybrid vehicle according to claim 15 wherein said processor calculates distribution of energy state of the hybrid vehicle at the predetermined time using the distribution of elevations, and generates the signal for controlling the regenerative system and the engine using the distribution of energy state.

19. The hybrid vehicle according to claim 18 wherein said processor determines range of target energy storage quantity according to the distribution of energy state at the predetermined time and controls the regenerative system and the engine to satisfy the range.

20. The hybrid vehicle according to claim 15 wherein said processor calculates the probability by calculating probability of route choice at a junction included the map information, and the probability of route choice shows a degree of which route is chosen from routes connected to the junction.

21. The hybrid vehicle according to claim 20 wherein said processor changes a value of the probability of route choice according to width of the routes.

22. The hybrid vehicle according to claim 20, further comprising a receiver connected to said vehicle controller which receives traffic congestion information that shows degree of traffic congestion of the routes, wherein said processor changes value of probability of route choice according to the traffic congestion information.

23. A controller for a hybrid vehicle for controlling a regenerative system for converting kinetic energy and an engine included the hybrid vehicle comprising:

means for predicting a plurality of points that the hybrid vehicle can reach at predetermined time, using stored map information;

means for calculating the hybrid vehicle's velocity variable range at the predetermined time;

means for calculating distribution of the velocity variable range at the predetermined time, using the probability and the velocity variable range; and means for outputting a signal for controlling the regenerative system and the engine based on the distribution of the velocity variable range.

* * * * *